(12) United States Patent
Svec

(10) Patent No.: US 11,237,336 B2
(45) Date of Patent: Feb. 1, 2022

(54) HOLLOW SHAFT OPTICAL ROTARY JOINT

(71) Applicant: Northrop Grumman Systems Corporation, Falls Church, VA (US)

(72) Inventor: Christopher B. Svec, Palatine, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 16/861,782

(22) Filed: Apr. 29, 2020

(65) Prior Publication Data

US 2021/0341676 A1    Nov. 4, 2021

(51) Int. Cl.
| | |
|---|---|
| G02B 6/36 | (2006.01) |
| F21V 8/00 | (2006.01) |
| G02B 6/02 | (2006.01) |

(52) U.S. Cl.
CPC ......... *G02B 6/3604* (2013.01); *G02B 6/0096* (2013.01); *G02B 6/02361* (2013.01)

(58) Field of Classification Search
CPC ... G02B 6/3528; G02B 6/3604; G02B 6/3524
See application file for complete search history.

(56) References Cited

U.S. PATENT DOCUMENTS

| | | | |
|---|---|---|---|
| 4,165,913 A | 8/1979 | Fitch | |
| 4,190,318 A | 2/1980 | Upton, Jr. | |
| 4,278,323 A * | 7/1981 | Waldman | G02B 6/3604 250/227.11 |
| 4,460,242 A | 7/1984 | Birch et al. | |
| 4,943,137 A | 7/1990 | Speer | |
| 5,297,225 A * | 3/1994 | Snow | G02B 6/3604 250/227.11 |
| 5,978,438 A * | 11/1999 | Resnick | A61B 6/032 378/15 |

(Continued)

FOREIGN PATENT DOCUMENTS

| | | |
|---|---|---|
| DE | 102016225974 A1 | 6/2018 |
| EP | 1019763 A1 | 7/2000 |

(Continued)

OTHER PUBLICATIONS

Extended European Search Report dated Sep. 28, 2021 (11 pages).

*Primary Examiner* — Eric Wong
(74) *Attorney, Agent, or Firm* — Edell, Shapiro & Finnan, LLC

(57) ABSTRACT

An optical rotary joint includes first and second hollow tubular members. At least one of the first and second hollow tubular members is rotatable about a common longitudinal axis. A ring shaped optical waveguide between the first and second hollow tubular members includes first and second axial faces oriented perpendicular to the common longitudinal axis, an inner circumferential edge facing the outer circumference of the first hollow tubular member, an outer circumferential edge facing the inner circumference of the second hollow tubular member, and a circular light scattering channel formed in the first and/or second axial faces. First optical emitters are arranged to face the outer or inner circumferential edge. Second optical emitters are arranged to face the channel. A first optical receiver is arranged to face the outer or inner circumferential edge. A second optical receiver is arranged to face the channel.

20 Claims, 11 Drawing Sheets

(56) References Cited

U.S. PATENT DOCUMENTS

| | | | | |
|---|---|---|---|---|
| 6,385,367 | B1* | 5/2002 | Rogers | G02B 6/3604 385/25 |
| 7,526,155 | B2 | 4/2009 | Hirohashi et al. | |
| 2006/0193555 | A1* | 8/2006 | Schilling | G02B 6/0096 385/25 |
| 2006/0202135 | A1 | 9/2006 | Koitabashi | |
| 2009/0154875 | A1 | 6/2009 | Schmidt et al. | |
| 2009/0154936 | A1 | 6/2009 | Schierling et al. | |
| 2012/0207430 | A1* | 8/2012 | Zhang | G02B 6/4249 385/26 |
| 2014/0341505 | A1* | 11/2014 | Cottrell | G02B 6/3604 385/26 |
| 2021/0057861 | A1* | 2/2021 | Zhang | H01R 39/14 |

FOREIGN PATENT DOCUMENTS

| | | |
|---|---|---|
| EP | 1178339 A2 | 2/2002 |
| JP | S57138231 A | 8/1982 |

* cited by examiner

HOLLOW SHAFT OPTICAL ROTARY JOINT

BACKGROUND

Field of the Invention

The present invention relates generally to rotary joints, and more particularly, to a method and apparatus for transmitting signals across rotary joints.

Related Art

Slip rings may be used to allow signals to flow across a rotatable joint. Some slip rings may be used to transfer or communicate data to and/or from an assembly that is continuously rotating. Some conventional slip rings use electrical contacts and some area/real estate along the rotational axis per contact, which may be bulky for a large amount of contacts. Generally, electrical contact slip rings are unable to support gigabit data speeds because of bandwidth limitations. Although some conventional optical slip rings support high-speed data transmission, these slip rings are often bulky, use specialty parts, and/or do not allow for a hollow shaft.

SUMMARY OF THE INVENTION

In one aspect of the invention, an optical rotary joint is provided. The optical rotary joint comprises a first hollow tubular member including an outer circumferential surface of a first diameter. The optical rotary joint comprises a second hollow tubular member including an inner circumferential surface of a second diameter larger than the first diameter. The first hollow tubular member is disposed within the second hollow tubular member. At least one of the first and second hollow tubular members is rotatable about a common longitudinal axis. The optical rotary joint comprises a ring shaped optical waveguide disposed between the first and second hollow tubular members and formed of light transmissive material. The ring shaped optical waveguide includes first and second axial faces oriented perpendicular to the common longitudinal axis, an inner circumferential edge facing the outer circumference of the first hollow tubular member, an outer circumferential edge facing the inner circumference of the second hollow tubular member, and a circular light scattering channel formed in at least one of the first and second axial faces of the ring shaped optical waveguide. The optical rotary joint comprises a first set of optical emitters arranged to face one of the outer circumferential edge of the ring shaped optical waveguide and the inner circumferential edge of the ring shaped optical waveguide. The first set of optical emitters is configured to emit optical signals in a first optical spectrum. The optical rotary joint comprises a second set of optical emitters arranged to face the circular light scattering channel in the ring shaped optical waveguide, wherein the second set of optical emitters is configured to emit optical signals in a second optical spectrum. The optical rotary joint comprises a first optical receiver arranged to face one of the outer circumferential edge of the ring shaped optical waveguide and the inner circumferential edge of the ring shaped optical waveguide. The first optical receiver is configured to receive, via the ring shaped optical waveguide, optical signals emitted in the second optical spectrum. The optical rotary joint comprises a second optical receiver arranged to face the circular light scattering channel in the ring shaped optical waveguide. The second optical receiver is configured to receive, via the ring shaped optical waveguide, optical signals emitted in the first optical spectrum.

In another aspect of the invention, a method of transmitting signals across a rotary joint is provided. The method includes applying a first electrical signal to a first set of optical emitters to cause the first set of optical emitters to emit optical signals in a first optical spectrum, wherein the first set of optical emitters is arranged to face one of an outer circumferential edge of a ring shaped optical waveguide and an inner circumferential edge of the ring shaped optical waveguide. The method further includes receiving light emitted from the first set of optical emitters at a first optical receiver, wherein the first optical receiver arranged to face a circular light scattering channel of the ring shaped optical waveguide. A second electrical signal may be applied to a second set of optical emitters to cause the second set of optical emitters to emit optical signals in a second optical spectrum, wherein the second set of optical emitters is arranged to face the circular light scattering channel in the ring shaped optical waveguide, and light emitted from the second set of optical emitters may be received at a second optical receiver, wherein the second optical receiver is arranged to face one of the outer circumferential edges of the ring shaped optical waveguide.

BRIEF DESCRIPTION OF THE DRAWINGS

Example embodiments of the invention are described herein with reference to the accompanying drawing figures, in which like reference numerals in the various figures are utilized to designate like components, and in which.

DETAILED DESCRIPTION

Described herein is a rotary joint with optical components (referred to herein as "the optical rotary joint") capable of two-way transmission of signals at high data rates. In an example embodiment, the optical rotary joint includes a first hollow tubular member including an outer circumferential surface of a first diameter, a second hollow tubular member including an inner circumferential surface of a second diameter larger than the first diameter, a ring shaped optical waveguide disposed between the first and second hollow tubular members and formed of light transmissive material, a first set of optical emitters arranged to face one of the outer circumferential edge of the ring shaped optical waveguide and the inner circumferential edge of the ring shaped optical waveguide, a second set of optical emitters arranged to face the circular light scattering channel in the ring shaped optical waveguide, a first optical receiver arranged to face one of the outer circumferential edge of the ring shaped optical waveguide and the inner circumferential edge of the ring shaped optical waveguide, and a second optical receiver arranged to face the circular light scattering channel in the ring shaped optical waveguide. The first hollow tubular member is disposed within the second hollow tubular member, and wherein at least one of the first and second hollow tubular members is rotatable about a common longitudinal axis. the ring shaped optical waveguide includes first and second axial faces oriented perpendicular to the common longitudinal axis, an inner circumferential edge facing the outer circumference of the first hollow tubular member, an outer circumferential edge facing the inner circumference of the second hollow tubular member, and a circular light scattering channel formed in at least one of the first and second axial faces of the ring shaped optical waveguide. The first set of optical emitters is configured to emit optical signals in a first optical spectrum. The second set of optical emitters is configured to emit optical signals in a second optical spectrum. The first optical receiver is configured to receive, via the ring shaped optical waveguide, optical signals emitted in the second optical spectrum. The second optical receiver is configured to receive, via the ring shaped optical waveguide, optical signals emitted in the first optical spectrum.

Figure 1:
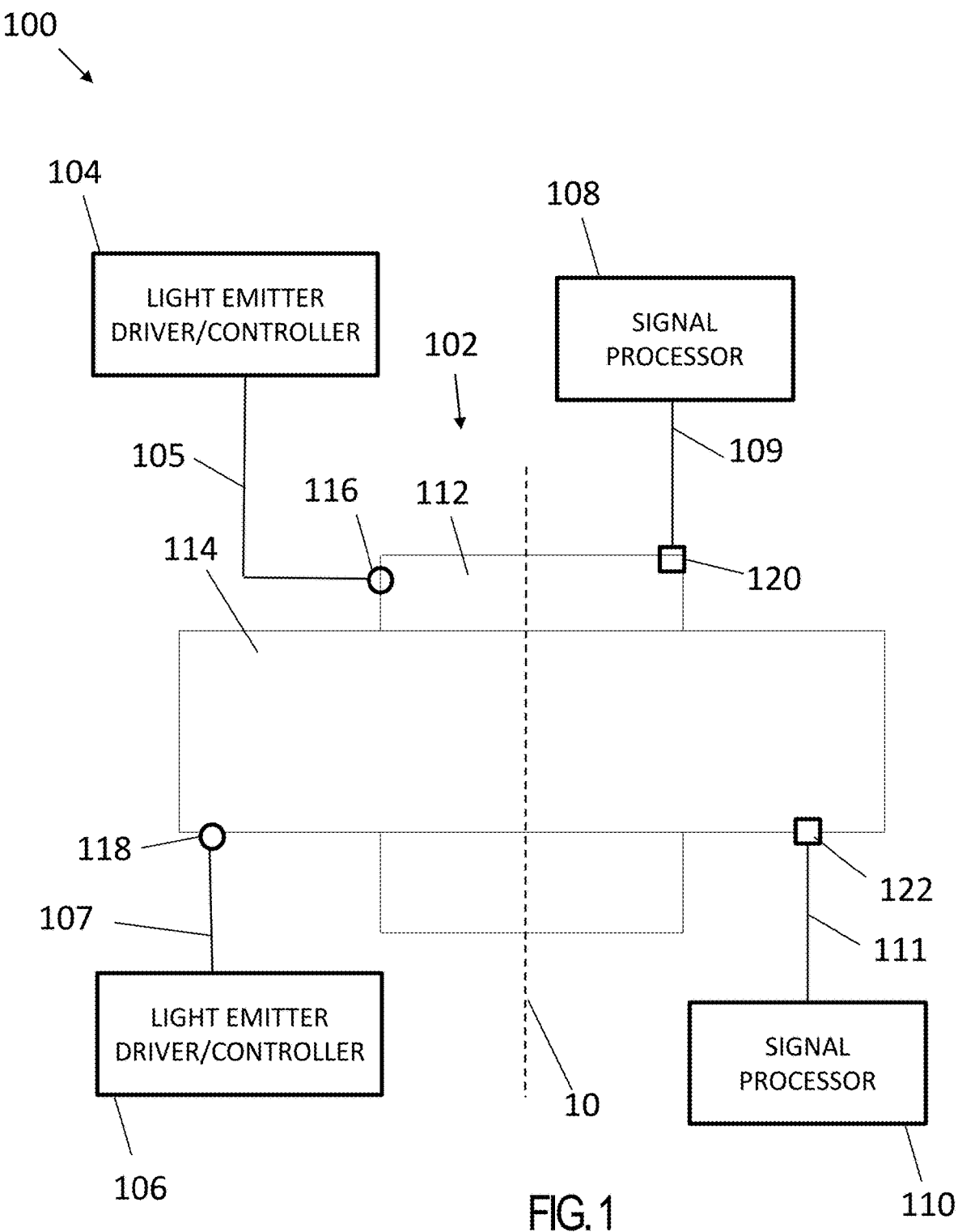
FIG. 1 is a schematic diagram of a system employing an optical rotary joint according to an example embodiment.

Referring to FIG. 1, a system 100 employing an optical rotary joint 102 is shown according to an example embodiment. The system 100 includes optical rotary joint 102, a first light emitter driver/controller 104, a second light emitter driver/controller 106, a first signal processor 108, and a second signal processor 110.

The optical rotary joint 102 allows for bi-directional optical communication within a low profile and allowing a hollow shaft.

The optical rotary joint 102 includes a first hollow tubular member 112, a ring shaped optical waveguide 113 (see FIGS. 5-10), a second hollow tubular member 114, a first set of optical emitters 116 (e.g., light emitting diodes or LEDs), a second set of optical emitters 118, one or more first optical receivers 120 (e.g., photodiodes), and one or more second optical receivers 122. The first set of optical emitters 116 are driven/controlled by the first light emitter/driver controller 104, and the second set of optical emitters 118 are driven/controlled by the second light emitter/driver controller 106. The first optical receivers 120 are connected to the first signal processor 108, and the second optical receivers 122 are connected to the second signal processor 110.

The first hollow tubular 112 member may be made of, for example, metal, plastic, or composite. The second hollow tubular member 114 may be made of, for example, metal, plastic, or composite. In the example shown in FIG. 1, the first hollow tubular member 112 is disposed within the second hollow tubular member 114. At least one of the first and second hollow tubular members 112, 114 is rotatable about a common longitudinal axis 10. For example, the first hollow tubular member 112 may be rotatable about the common longitudinal axis 10, and the second hollow tubular member 114 may be stationary.

The ring shaped optical waveguide 113 may be formed of a material that is transmissive of the wavelengths of light emitted by the light emitters 116 and 118, such as, for example, optical grade glass (e.g., BK7 available from Schott, soda-lime glass, and/or window pane glass) or plastic (e.g., polycarbonate, polystyrene, and/or acrylic). The ring shaped optical waveguide 113 may be advantageously configured as an optical diffuser/homogenizer that outputs light of more uniform intensity than that which is inputted. The ring shaped optical waveguide 113 may be configured to homogenize light that enters from its edge in such a way that it exits from a circular light scattering ring of the ring shaped optical waveguide. The ring shaped optical waveguide 113 may be disposed between the first hollow tubular member 112 and the second hollow tubular member 114. The ring shaped optical waveguide 113 may be attached to the first hollow tubular member 112 such that the ring shaped optical waveguide 113 rotates with the first hollow tubular member 112.

The ring shaped optical waveguide 113 includes first and second axial faces 115, 117 oriented perpendicular to the common longitudinal axis 10. The ring shaped optical waveguide 113 includes an inner circumferential edge 119 facing the outer circumference of the first hollow tubular member 112, an outer circumferential edge 121 facing the inner circumference of the second hollow tubular member 114, and a circular light scattering channel 123 formed in at least one of the first and second axial faces 115, 117 of the ring shaped optical waveguide 113. In an example, the circular light scattering channel 123 may be formed in one axial face of the waveguide and may have a V-shaped cross-section. In an example in which the circular light scattering channel 123 has a V-shaped cross-section, an angle of the apex may be in the range of 10° to 160°, and preferably between 60° and 120°. The circular light scattering channel 123 may be centrally located on the axial face of the waveguide or located closer to the inner edge or the outer edge. The circular light scattering channel 123 may be located in the ring shaped optical waveguide 113 to align with the light emitters 116 and/or 118, and to align with the optical receivers 120 and/or 122, when arranged to face the circular light scattering channel 123. The location of the circular light scattering channel 123 in the ring shaped optical waveguide 113 may be selected based on an arrangement of the light emitters 116, the light emitters 118, the optical receivers 120, and/or the optical receivers 122, and/or any other packaging constraints. The flexibility of the location for the circular light scattering channel allows it to accommodate various sizes or diameters of arrangements of light emitters and/or optical receivers. In an example, the ring shaped optical waveguide 113 is an optical homogenizer disposed between the first hollow tubular member 112 and the second hollow tubular member 114 to cause the light emitted by the optical emitters 114, 116 to be emitted across the optical rotary joint 102 in an even manner during rotation.

The first set of optical emitters 116 are configured to emit optical signals in a first optical spectrum (e.g., in the range of 805 to 815 nm). The first set of optical emitters 116 may be arranged to face one of the outer circumferential edge of the ring shaped optical waveguide and the inner circumferential edge of the ring shaped optical waveguide. In the example shown, the first set of optical emitters 116 are mounted on the first hollow tubular member 112. For example, the first set of optical emitters 116 may be disposed within recesses or holes formed in the first hollow tubular member 112 and fixed in place using mechanical fixation methods and/or adhesives. As such, if the first hollow tubular member 112 rotates, then the first set of optical emitters 116 also rotate with the first hollow tubular member 112. The first set of optical emitters 116 may include a number of optical emitters that allows for communication of signals with a sufficient amount of power to be detected by the one or more optical receivers 122. The first set of optical emitters 116 may be employed for communicating a first set of signals from the first hollow tubular member 112 to the second hollow tubular member 114 across the rotary joint. The second set of optical emitters 118 may be employed for communicating a second set of signals from the second hollow tubular member 114 to the first hollow tubular member 112 across the rotary joint. The first light emitter driver/controller 104 communicates with the first set of optical emitters 116 via wires 105 extending through the first hollow tubular member 112. Light emitter driver/controller 104 may communicate electrical signals via wires 105 to the first set of optical emitters 116, which, in response, produce light. For example, the light emitter driver/controller 104 may communicate electrical signal pulses via wires 105 to the first set of optical emitters 116, and in response, the first set of optical emitters 116 produce light signal pulses. The second light emitter driver/controller 106 similarly communicates with the second set of optical emitters 118 via wires 107 extending through the second hollow tubular member 114.

The one or more first optical receivers 122 are configured to receive optical signals emitted in the first optical spectrum. The one or more optical receivers 122 may be arranged to face the circular light scattering channel 123 in the ring shaped optical waveguide 113. As such, when the first set of optical emitters 116 emit light in a direction facing the inner or outer circumferential edge, the light is received by the one or more optical receivers 122 via the ring shaped optical waveguide 113. The one or more optical receivers 122 may communicate with signal processor 110 via one or more wires 111. The one or more optical receivers 120 may communicate with signal processor 108 via one or more wires 109.

The second set of optical emitters 118 are configured to emit optical signals in a second optical spectrum (e.g., in the range of 830 to 840 nm). The second set of optical emitters 118 may be arranged to face the circular light scattering channel 123 in the ring shaped optical waveguide 113. In an example, the second set of optical emitters 118 are mechanically coupled to the second hollow tubular member 114. The second set of optical emitters 118 may include a sufficient number of optical emitters that allows for communication of signals with enough power to be detected by the one or more optical receivers 120.

The one or more optical receivers 120 are configured to receive optical signals emitted in the second optical spectrum. The one or more optical receivers 120 may be arranged to face the circular light scattering channel in the ring shaped optical waveguide. As such, when the second set of optical emitters 118 emit light in a direction facing the circular light scattering channel, the light is received by the one or more optical receivers 120 via the ring shaped optical waveguide.

In an example embodiment, the optical emitters 116, 118 are bare-chip, high speed LEDs. Example LEDs may that be employed are LIU850A available by Thorlabs Inc.

Each of the optical receivers 118, 120 may have narrow bandpass optical filters. The passbands of the optical receivers 118 and the optical receivers 120 may be offset from each other to prevent crosstalk between outgoing (e.g., in a direction from the first hollow tubular member 112 to the second hollow tubular member 114) optical signals and incoming (in a direction from the second hollow tubular member 114 to the first hollow tubular member 112) optical signals. The filters may be based on Alluxa 830-0.4 OD5 Ultra Narrow Bandpass Filter for the filter centered around 830 nm. The other filters may be shifted in wavelength.

Figure 11:
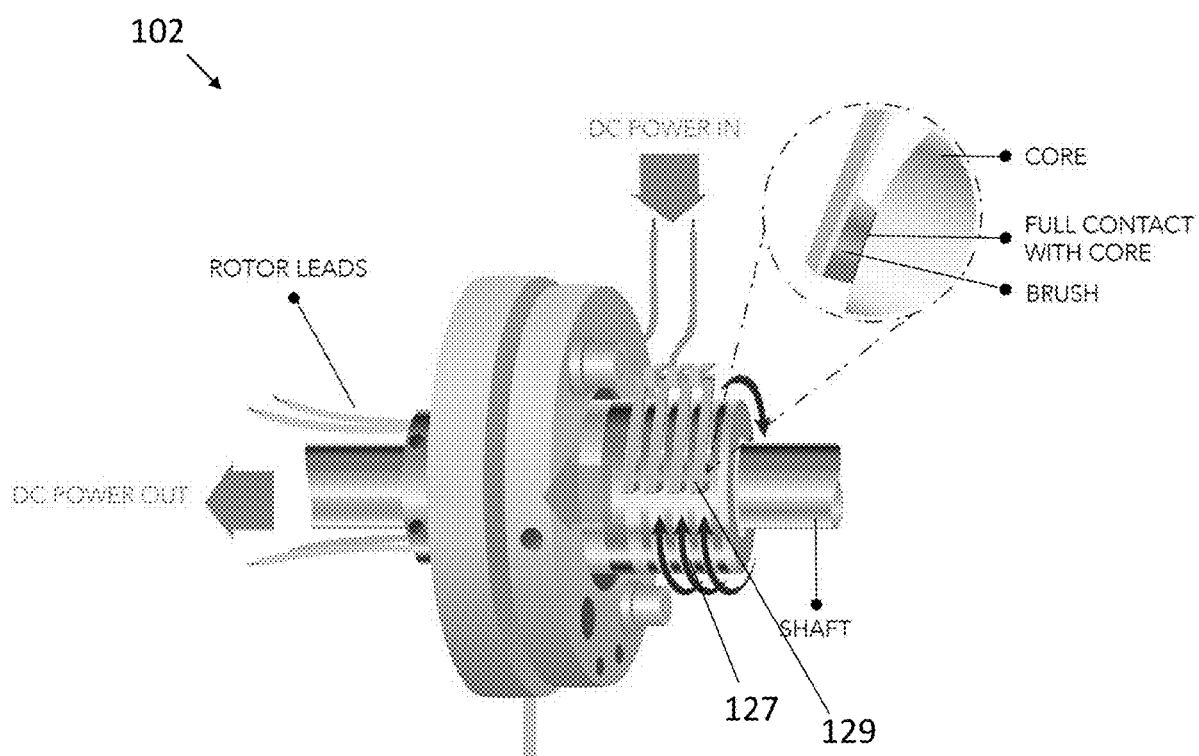
FIG. 11 is a perspective view of the optical rotary joint of FIG. 1 according to an example embodiment.

To provide power across the optical rotary joint 102, conductive rings 127 and conductive brushes 129 may be employed, as shown in FIG. 11, which is a perspective view of the optical rotary joint 102, according to an example embodiment. For example, the conductive rings 127 may be arranged between the first and second hollow tubular members 112, 114 and may be aligned with the common axis. The conductive brushes 129 may be arranged so as to be able to make contact with the conductive rings 127 to allow for power flow between the conductive rings 127 and conductive brushes 129. In an example, the conductive rings 127 are attached to the first hollow tubular member 112 and the conductive brushes 129 are attached to the second hollow tubular member 114. In this example, the conductive rings 127 may rotate together with the first hollow tubular member 112 and the conductive brushes 129 may remain stationary with the second hollow tubular member 114. In another example, the conductive rings 127 are attached to the second hollow tubular member 114 and the conductive brushes 129 are attached to the first hollow tubular member 112. In an example, power may be provided by a conventional metal-contact slip ring, such as, for example, AC4598-6 available from Moog Inc.

The optical emitters 116 may be mounted around the circumference of the first hollow tubular member 112. The optical emitters 116 may be driven by a common signal from the light emitter driver/controller 104.

The optical emitters 118 may be mounted around the circumference of the second hollow tubular member 114. The optical emitters 118 may be driven by a common signal from the light emitter driver/controller 106.

The optical receivers 120, 122 may be mounted on the first hollow tubular member 112 and the second hollow tubular member 114, respectively.

The optical rotary joint 100 includes signal processors 108, 110. Signal processor 110 may process signals output by optical receivers 122, which may convert light signals emitted from the first set of optical emitters 116 into electrical signals. Signal processor 108 may process signals output by optical receivers 120, which may convert light signals emitted from the second set of optical emitters 118 into electrical signals.

In operation, the light emitter driver/controller 104 causes a light signal to be emitted from the first set of optical emitters 116. The light signal emitted from the first set of optical emitters 116 enters the ring shaped optical waveguide 113 through an edge of the ring shaped optical waveguide 113. The light signal from the first set of optical emitters 116 is internally reflected in the optical waveguide 113 and homogenized to have a more uniform intensity, some of which (e.g., at least 20% of the light emitted from the first set of optical emitters 116) exits the ring shaped optical waveguide 113 through the scattering channel of the ring shaped optical waveguide 113. If the optical emitter 116 is positioned such that the emitted light signal enters the ring shaped optical waveguide from the side, then the light exits from the circular light scattering channel of the ring shaped optical waveguide 113. The light that exits from the circular light scattering channel may then be detected by the optical receivers facing the light scattering channel and configured to detect the light. If the optical emitter is positioned such that the emitted light signal enters the ring shaped optical waveguide from the circular light scattering channel, then the light exits from the side of the waveguide. The light that exists from the side of the waveguide may then be detected by the optical receivers facing the side of the waveguide.

In an example, four of the first optical emitters 116 may be mounted on the first hollow tubular member 112. All four of the first optical emitters 116 are driven with a signal such that they fire simultaneously. The signal may be a digital on/off signal, and the length of the pulse can be constant or vary.

In an example, the optical receivers 122 may be mounted on the second hollow tubular member 114. Each of the optical receivers 122 may have a narrowband filter. The four optical emitters 116 may blink on and off in a specified frequency band. The light signal emitted by the optical emitters 116 is diffused throughout the ring shaped optical waveguide 113. The optical receiver 122 may be arranged to look at filtered light of that emitted from the emitters 116 on the first hollow tubular member 112. The signal may be digitally encoded (e.g., using a hotlink digital encoding scheme). The optical receiver 122 may provide a signal representing the detected light to the signal processor 122. The signal may be amplified by an amplifier prior to being provided to the signal processor 122.

Figure 2:
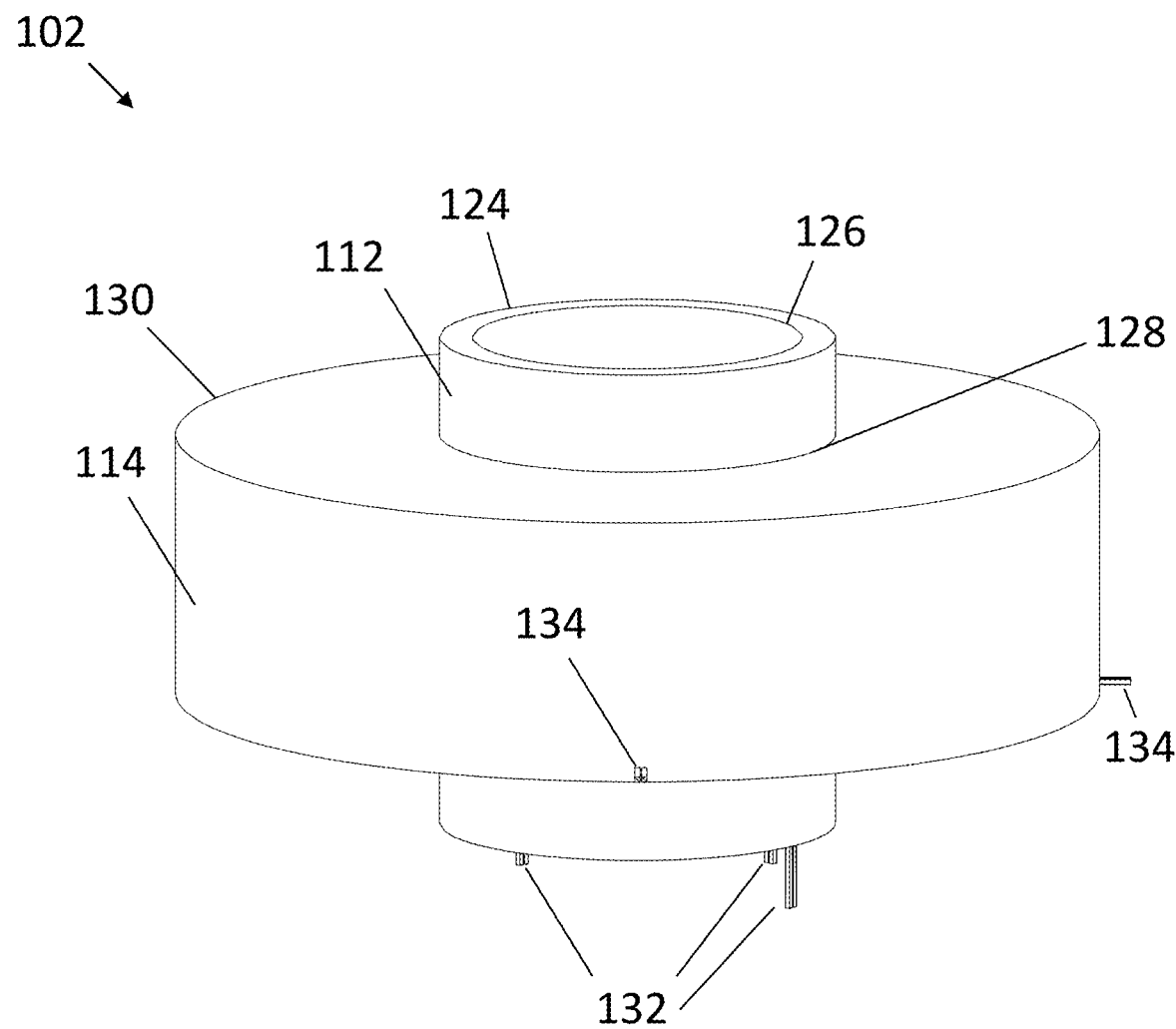
FIG. 2 is a perspective view of the optical rotary joint of FIG. 1 according to an example embodiment.

FIG. 2 is a perspective view of the optical rotary joint 102 of FIG. 1 according to an example embodiment. As shown in the example of FIG. 2, the first hollow tubular member 112 includes an outer circumferential surface 124 and an inner circumferential surface 126.

As shown in the example of FIG. 2, the second hollow tubular member 114 includes an inner circumferential surface 128 and an outer circumferential surface 130. The inner circumferential surface 128 of the second hollow tubular member 114 has a diameter that is larger than the diameter of the outer circumferential surface 124 of the first hollow tubular member 112. As such, the first hollow tubular member 112 is able to be disposed within the second hollow tubular member 114. The first hollow tubular member 112 may fit coaxially within the opening or hollow portion of the second hollow tubular member 114.

The first hollow tubular member 112 includes electrical leads 132. Each of the optical receivers 122 of the first hollow tubular member 112 has a respective electrical lead 132. One or more of the electrical leads 132 may represent the wire 111 in FIG. 1. The electrical leads 132 may be connected to one or more devices that rotate with the first hollow tubular member 112 to provide control signals and/or data signals to and/or from the one or more devices that may be connected to the first hollow tubular member 112. For example, a camera may be connected to the first hollow tubular member 112 such that the camera rotates with the first hollow tubular member. A first signal may be transmitted across the optical rotary joint 102 from the second hollow tubular member 114 and to the camera (e.g., to control the camera), and a second signal may be transmitted from the camera and across the optical rotary joint from the first hollow tubular member 112 to the second hollow tubular member 114. As another example, a camera and a steering mirror may be connected to the first hollow tubular member 112. A first signal may be emitted by the second set of optical emitters 118 and transmitted across the optical rotary joint 102 from the second hollow tubular member 114 to the first hollow tubular member to control the mirror. A second signal may be emitted by the third set of optical emitters and transmitted across the optical rotary joint 102 from the second hollow tubular member 114 to the first hollow tubular member 112 to control the camera. A third signal (e.g., triggered by a communication from the camera) may be emitted by the first set of optical emitters 116 and transmitted across the optical rotary joint 102 from the first hollow tubular member 112 to the second hollow tubular member 114.

The second hollow tubular member 114 includes electrical leads 134. Each of the optical receivers 120 of the second hollow tubular member 114 has a respective electrical lead 134. One or more of the electrical leads 134 may represent the wire 109 in FIG. 1.

Electrical leads 133 may also be connected respectively to the conductive rings and conductive brushes to provide power across the optical rotary joint 102.

Figure 3:
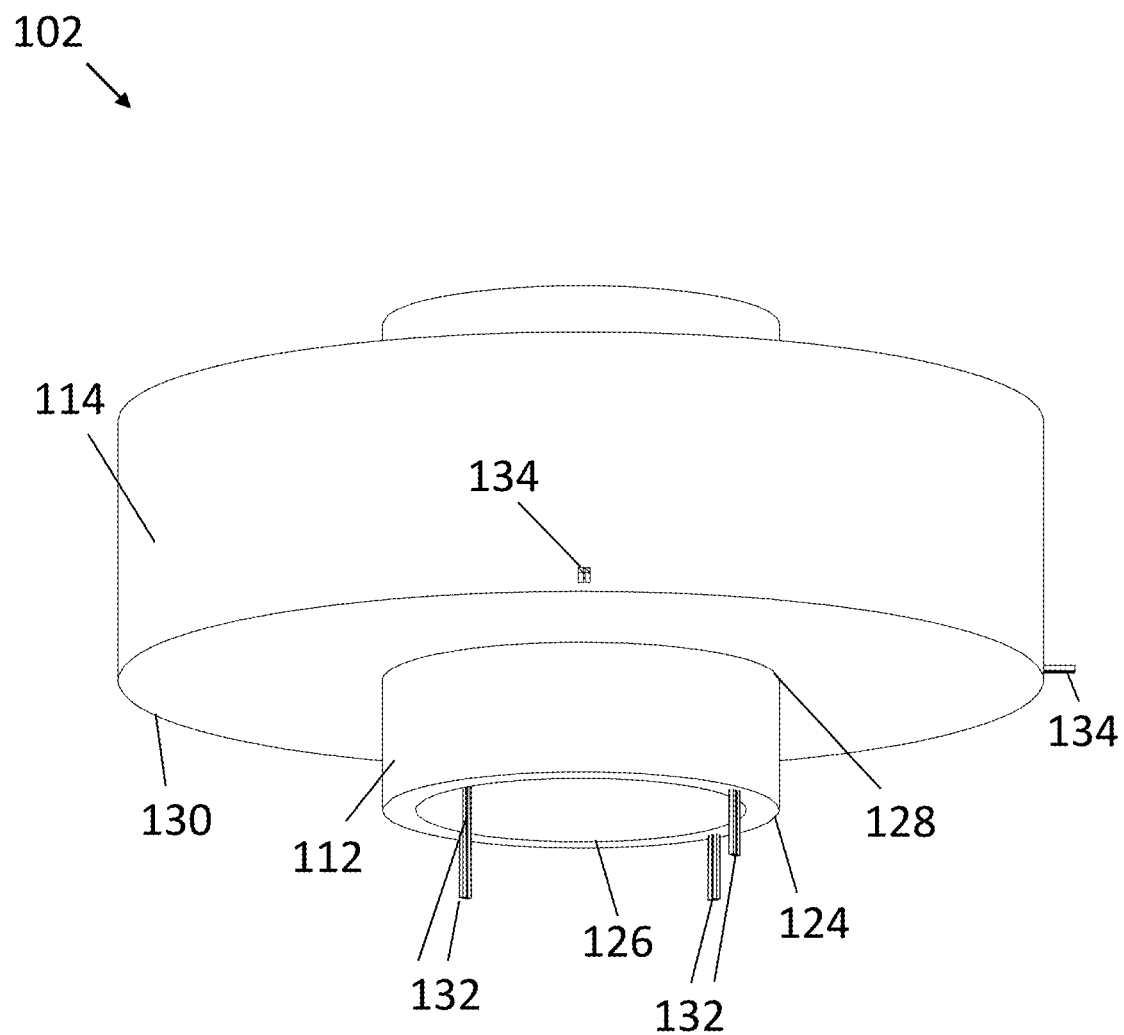
FIG. 3 is another perspective view of the optical rotary joint of FIG. 1 according to an example embodiment.

FIG. 3 is another perspective view of the optical rotary joint 102 of FIG. 1 according to an example embodiment. As shown in FIG. 3, the electrical leads 132 extend from the first hollow tubular member 112 and electrical leads 134 extends from the second hollow tubular member 114.

Figure 4:
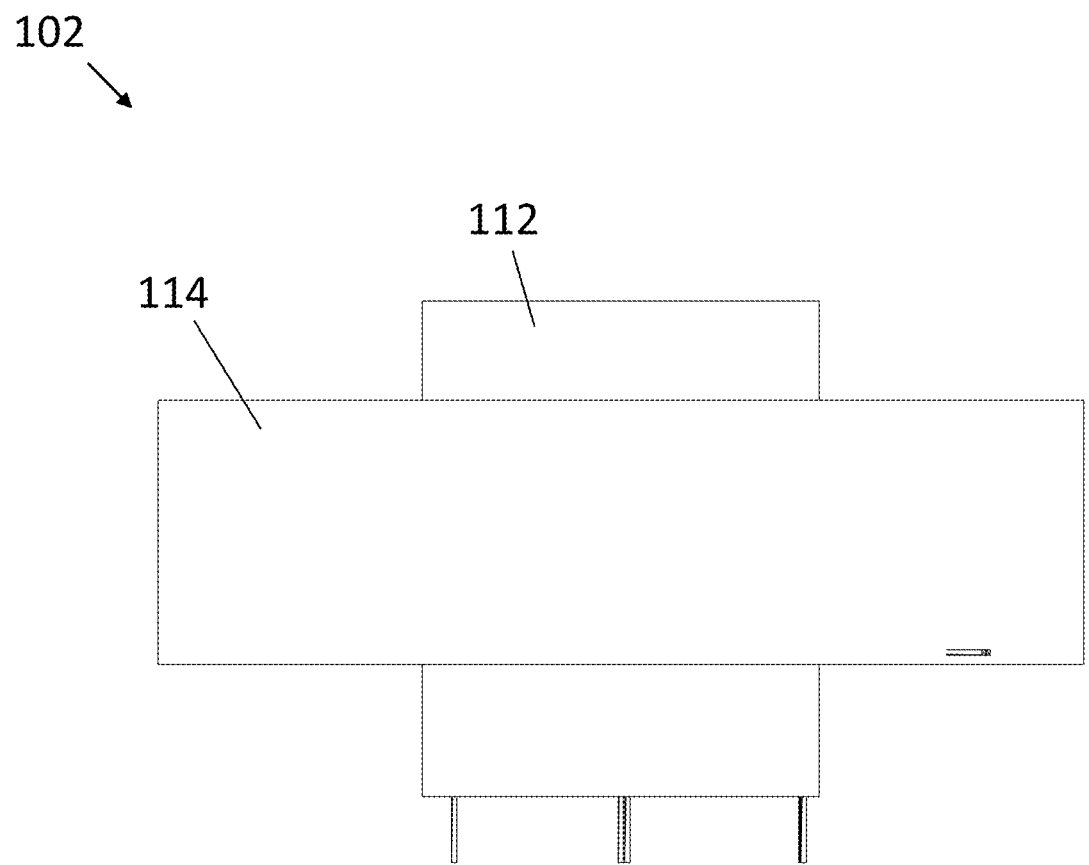
FIG. 4 is a side view of the optical rotary joint of FIG. 1 according to an example embodiment.

FIG. 4 is a side view of the optical rotary joint 102 of FIG. 1 showing first and second tubular members 112 and 114, according to an example embodiment.

Figure 5:
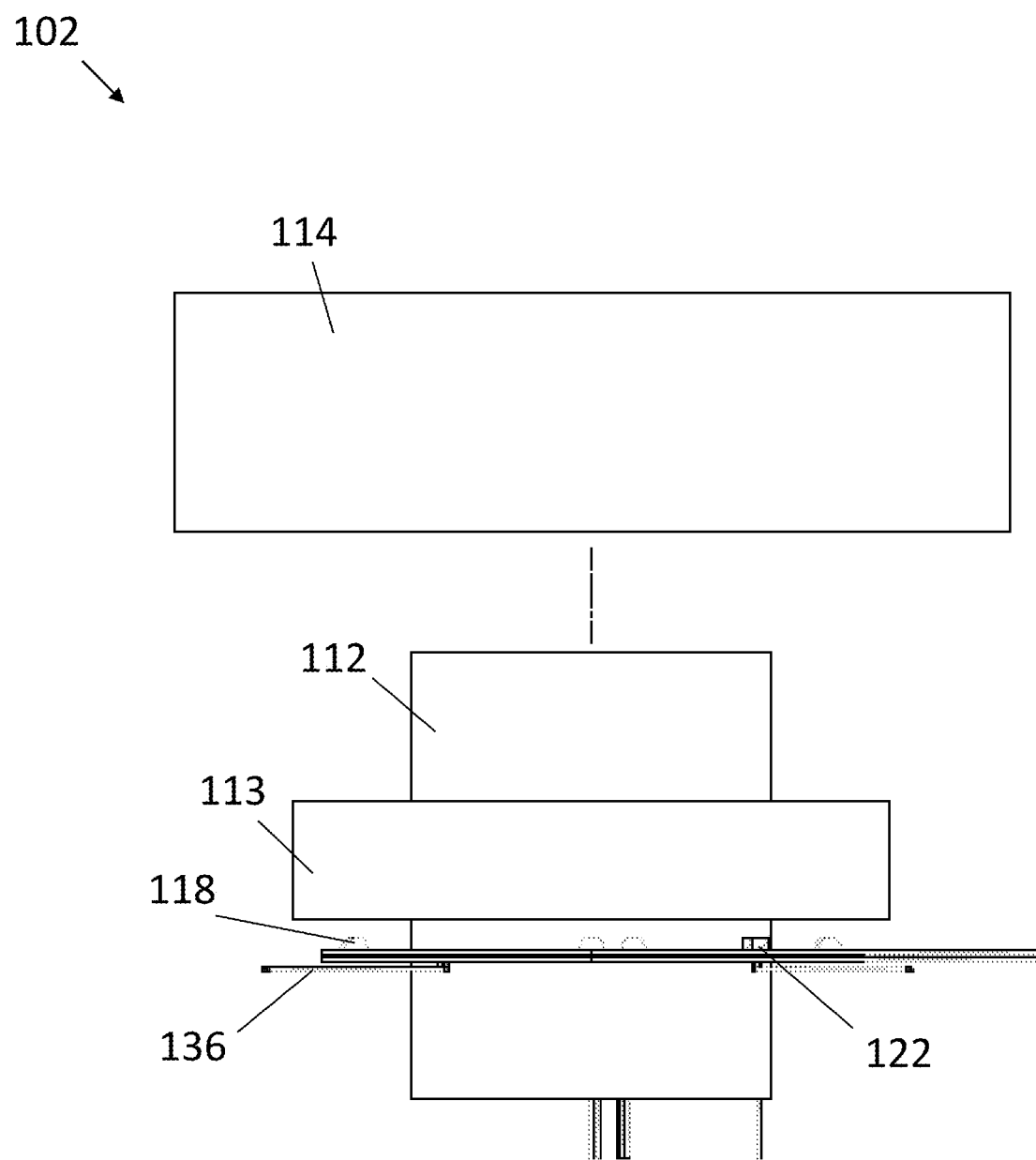
FIG. 5 is a partial exploded view of the optical rotary joint of FIG. 1 according to an example embodiment.

FIG. 5 is a partial exploded view of the optical rotary joint 102 of FIG. 1 according to an example embodiment. Shown in FIG. 5 is the first hollow tubular member 112, the ring shaped optical waveguide 113, and the second hollow tubular member 114. Each of the optical emitters 118 may be coupled to a first conductive ring assembly 136. The first conductive ring assembly 136 may allow for a common electrical signal to be provided to the optical emitters 118 such that the optical emitters 118 all emit light at substantially the same time. In an example, wires of the conductive ring assembly 136 may be traces printed on a circuit board, and the optical emitters 118 may be connected to each other along the trace. The circuit board may be fastened to the second hollow tubular member 114 using mechanical fixation methods and/or adhesives.

In an example, the optical rotary joint 102 includes a third set of optical emitters 138. The third set of optical emitters 138 are configured to emit optical signals in a third optical spectrum (e.g., in the range of 860 to 870 nm). Each optical emitter of the third set of optical emitters 138 may be coupled to a second conductive ring assembly 137. The second conductive ring assembly 137 may allow for a common electrical signal to be provided to the third set of optical emitters 138 such that the third set of optical emitters 138 all emit light at substantially the same time.

Figure 6:
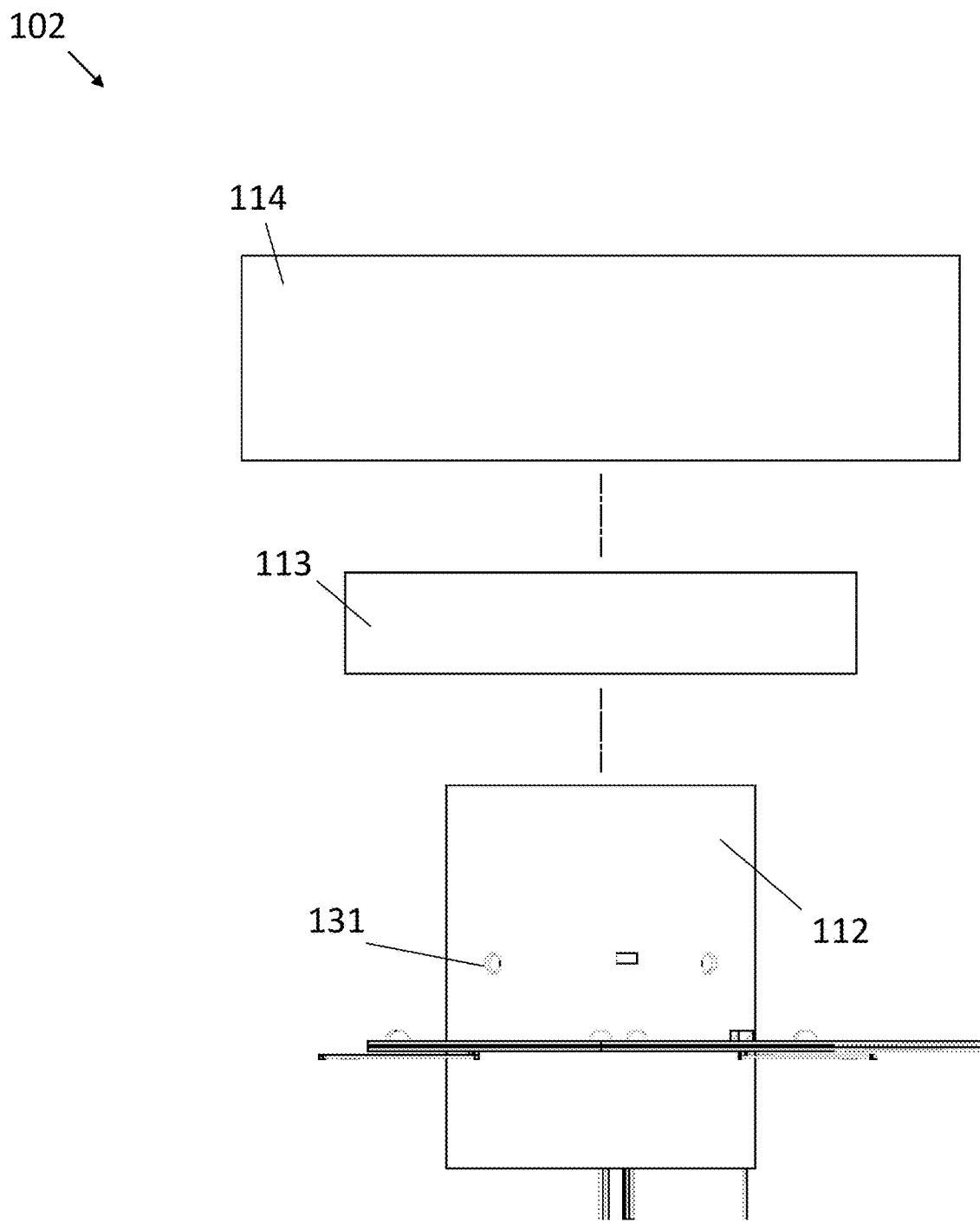
FIG. 6 is another partial exploded view of the optical rotary joint of FIG. 1 according to an example embodiment.

FIG. 6 is another partial exploded view of the optical rotary joint 102 according to an example embodiment. As shown in FIG. 6, the first hollow tubular member 112 may include a plurality of ports 131 to allow optical signals to pass through to the second hollow tubular member 114.

Figure 7:
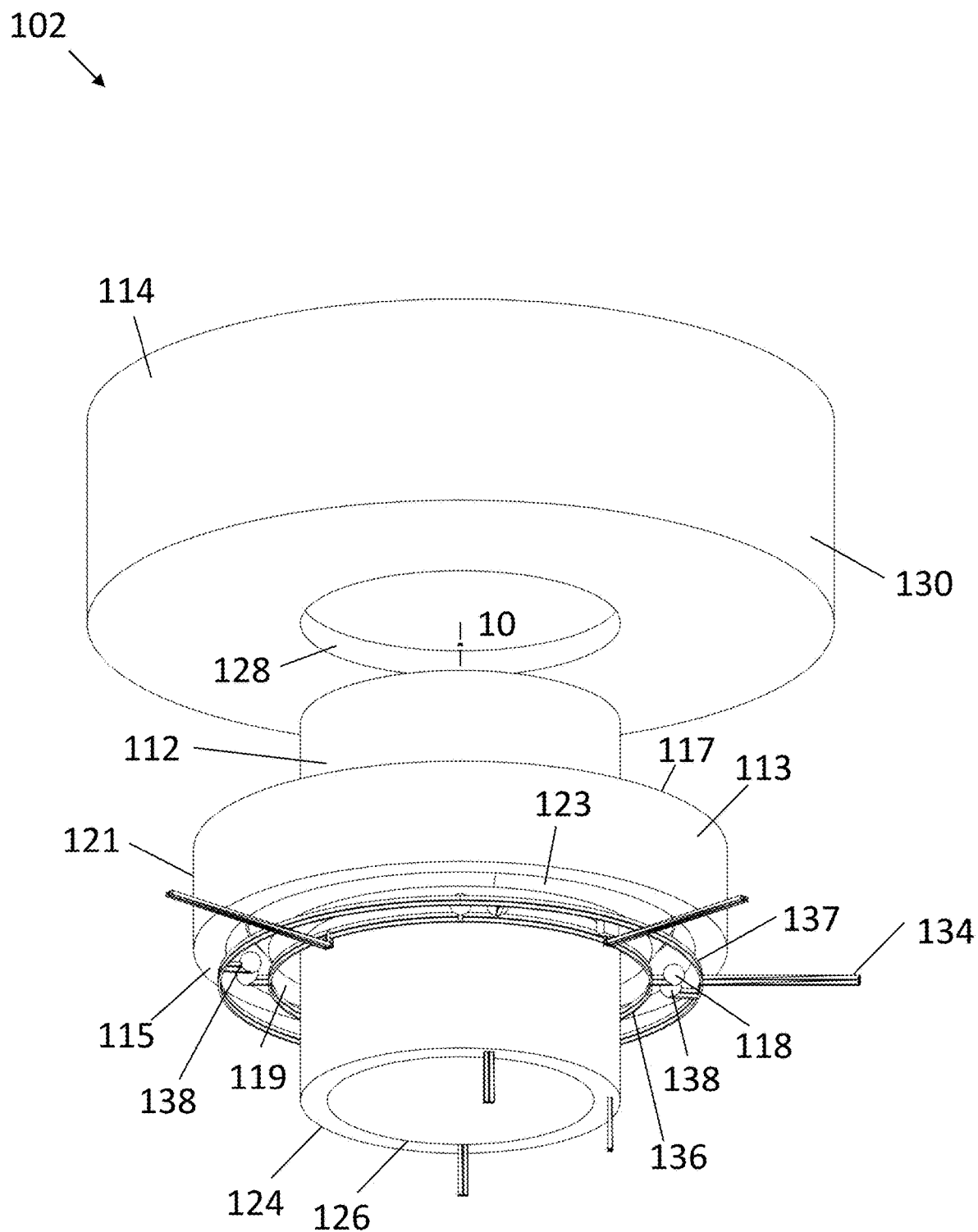
FIG. 7 is another partial exploded view of the optical rotary joint of FIG. 1 according to an example embodiment.

FIG. 7 is another partial exploded view of the optical rotary joint 102 according to an example embodiment. As shown, the ring shaped optical waveguide 113 includes first and second axial faces 115, 117 oriented perpendicular to the common longitudinal axis. The ring shaped optical waveguide 113 further includes an inner circumferential edge 119 facing the outer circumference of the first hollow tubular member, and an outer circumferential edge 121 facing the inner circumference of the second hollow tubular member. Also shown is a circular light scattering channel 123 formed in at least one of the first and second axial faces 115, 117 of the ring shaped optical waveguide 113.

Figure 8:
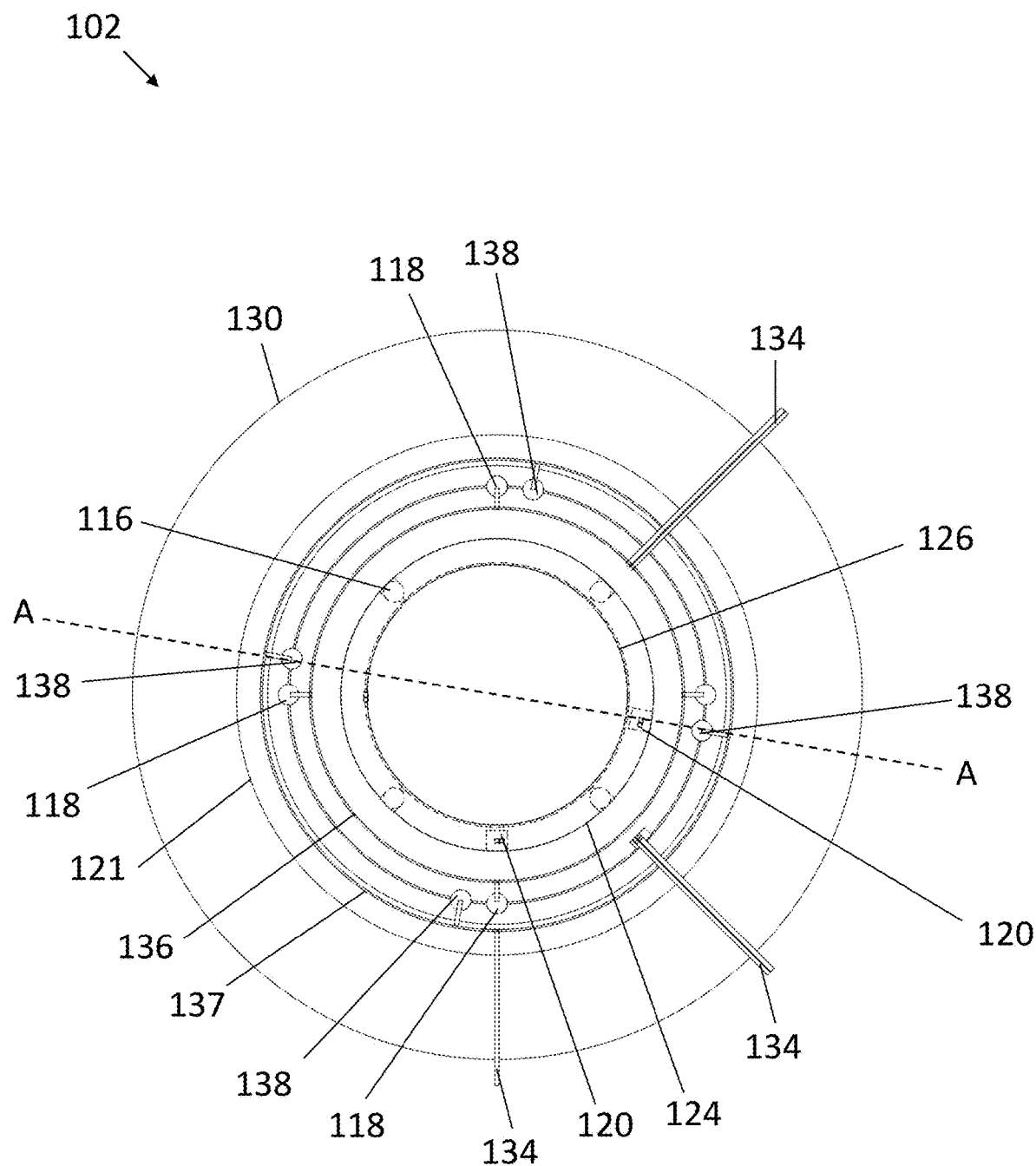
FIG. 8 is a bottom view of the optical rotary joint of FIG. 1 according to an example embodiment.

FIG. 8 is a bottom-up view of the optical rotary joint 102 according to an example embodiment.

Figure 9:
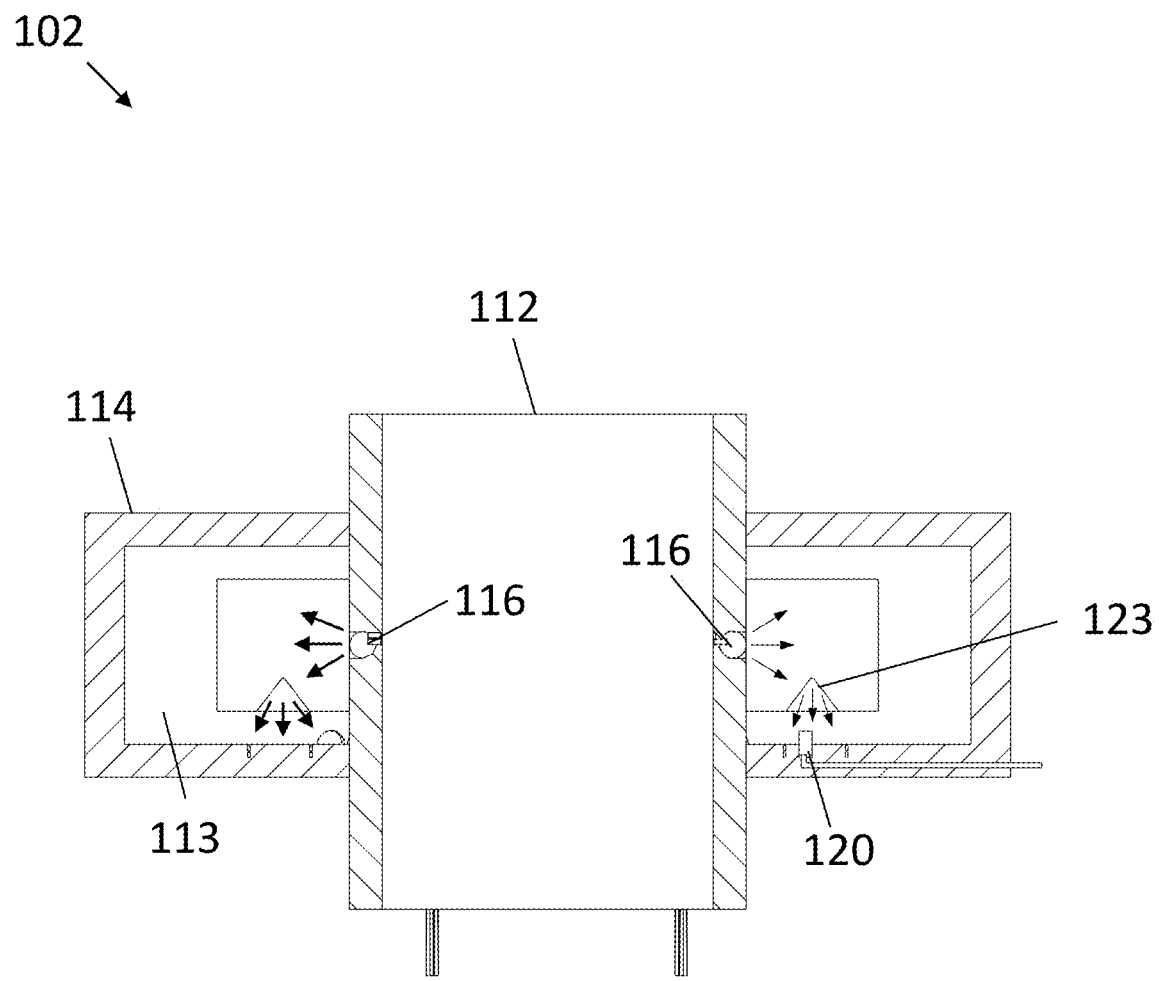
FIG. 9 is a cross-sectional view taken through line A-A in FIG. 8.

FIG. 9 is a cross-sectional view taken through line A-A in FIG. 8. As shown in FIG. 9, the optical emitters 116 may emit optical signals into an edge of the ring shaped optical waveguide 113. The optical signals may escape through the circular light scattering channel 123 of the ring shaped optical waveguide 113, and be detected by the optical receivers 122.

Figure 10:
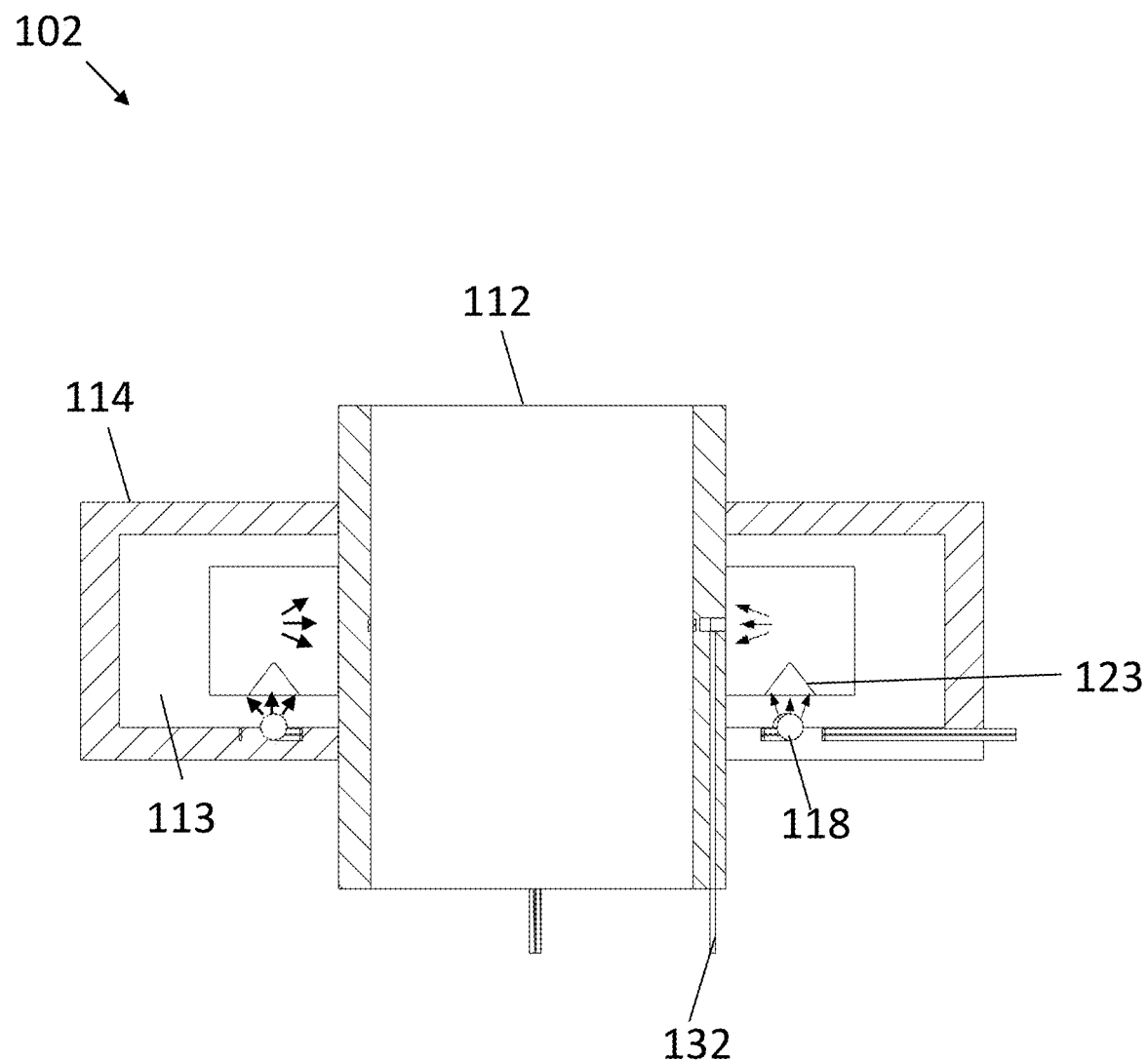
FIG. 10 is a cross-sectional view taken through line A-A in FIG. 8.

FIG. 10 is a cross-sectional view taken through line A-A in FIG. 8. As shown in FIG. 10, the optical emitters 118 may emit optical signals into the circular light scattering channel 123 of the ring shaped optical waveguide 113. The optical signals may escape through the edge of the ring shaped optical waveguide 113 and be detected by the optical receivers 120.

For communication of data across the optical rotary joint from the second hollow tubular member to the first hollow tubular member, the set of emitters on the second hollow tubular member may be driven by a first signal and the set of emitters on the first hollow tubular member may be driven by a second signal. Each set of emitters output a specific spectrum different than the other set. The different sets of emitters can emit simultaneously or at different times. For example, the first set may emit at a first time and the second set may emit at a second time later than the first time. Or the first set and the second set may emit at the same time. Two detectors are on the first hollow tubular member. One of the two detectors has a filter to see one set of emitters, and the other detector has a different filter to see the other set.

It will be appreciated that the example embodiments described above and illustrated in the accompanying drawings represent only a few of the many ways of implementing the invention. Various modifications of the invention in addition to those shown and described herein will be apparent to those skilled in the art from the foregoing description. For example, the first and second sets of emitters may all emit the same bandwidth of light, and a first set of filters may be used to block a first set of wavelengths from the first set of emitters and a second set of filters may be used to block a second set of wavelengths (different than the first set of wavelengths) from the second set of emitters. In addition, while separate light emitter driver/controllers are shown for the first and second sets of light emitters, it will be appreciated that a single light emitter driver/controller may be used. Similarly, while separate signal processors are shown for the first and second sets of receivers, it will be appreciated that a single signal processor may be used. Such modifications are intended to fall within the scope of the appended claims.

The invention claimed is:

1. An optical rotary joint comprising:
a first hollow tubular member including an outer circumferential surface of a first diameter;
a second hollow tubular member including an inner circumferential surface of a second diameter larger than the first diameter, wherein the first hollow tubular member is disposed within the second hollow tubular member, and wherein at least one of the first and second hollow tubular members is rotatable about a common longitudinal axis;
a ring shaped optical waveguide disposed between the first and second hollow tubular members and formed of light transmissive material, wherein the ring shaped optical waveguide includes first and second axial faces oriented perpendicular to the common longitudinal axis, an inner circumferential edge facing the outer circumference of the first hollow tubular member, an outer circumferential edge facing the inner circumference of the second hollow tubular member, and a circular light scattering channel formed in at least one of the first and second axial faces of the ring shaped optical waveguide;
a first set of optical emitters arranged to face one of the outer circumferential edge of the ring shaped optical waveguide and the inner circumferential edge of the ring shaped optical waveguide, wherein the first set of optical emitters is configured to emit optical signals in a first optical spectrum;
a second set of optical emitters arranged to face the circular light scattering channel in the ring shaped optical waveguide, wherein the second set of optical emitters is configured to emit optical signals in a second optical spectrum;
a first optical receiver arranged to face one of the outer circumferential edge of the ring shaped optical waveguide and the inner circumferential edge of the ring shaped optical waveguide, wherein the first optical receiver is configured to receive, via the ring shaped optical waveguide, optical signals emitted in the second optical spectrum; and
a second optical receiver arranged to face the circular light scattering channel in the ring shaped optical waveguide, wherein the second optical receiver is configured to receive, via the ring shaped optical waveguide, optical signals emitted in the first optical spectrum.

2. The optical rotary joint of claim 1, further comprising:
a third set of optical emitters arranged to face the circular light scattering channel in the ring shaped optical waveguide and configured to emit optical signals in a third optical spectrum; and
a third optical receiver arranged to face one of the outer circumferential edge of the ring shaped optical waveguide and the inner circumferential edge of the ring shaped optical waveguide, wherein the third optical receiver is configured to receive, via the ring shaped optical waveguide, optical signals emitted in the third optical spectrum.

3. The optical rotary joint of claim 1, wherein the ring shaped optical waveguide is fixed to the first hollow tubular member.

4. The optical rotary joint of claim 1, wherein the first optical receiver comprises an optical filter to filter optical signals of the second optical spectrum.

5. The optical rotary joint of claim 1, wherein the second optical receiver comprises an optical filter to filter optical signals of the first optical spectrum.

6. The optical rotary joint of claim 1, wherein the first set of optical emitters are mechanically coupled to the first hollow tubular member.

7. The optical rotary joint of claim 1, wherein the first optical receiver is mechanically coupled to the first hollow tubular member.

8. The optical rotary joint of claim 1, wherein the second set of optical emitters are mechanically coupled to the second hollow tubular member.

9. The optical rotary joint of claim 1, wherein the second optical receiver is mechanically coupled to the second hollow tubular member.

10. The optical rotary joint of claim 1, further comprising first optical emitter drive circuitry to cause the first set of optical emitters to emit optical signals.

11. The optical rotary joint of claim 1, further comprising second optical emitter drive circuitry to cause the second set of optical emitters to emit optical signals.

12. The optical rotary joint of claim 11, wherein the first optical emitter drive circuitry is configured to cause the first set of optical emitters to emit optical signals simultaneously for a predetermined duration.

13. The optical rotary joint of claim 12, wherein the second optical emitter drive circuitry is configured to cause the second set of optical emitters to emit optical signals simultaneously for a predetermined duration.

14. The optical rotary joint of claim 1, wherein the first set of optical emitters are arranged concentrically with respect to the common longitudinal axis.

15. The optical rotary joint of claim 1, wherein the first hollow tubular member includes a plurality of ports to allow optical signals to pass through to the second hollow tubular member.

16. A method of transmitting signals across a rotary joint, said method comprising the steps of:
applying a first electrical signal to a first set of optical emitters to cause the first set of optical emitters to emit optical signals in a first optical spectrum, wherein the first set of optical emitters is arranged to face one of an outer circumferential edge of a ring shaped optical waveguide and an inner circumferential edge of the ring shaped optical waveguide;
receiving light emitted from the first set of optical emitters at a first optical receiver, wherein the first optical receiver arranged to face a circular light scattering channel of the ring shaped optical waveguide;
applying a second electrical signal to a second set of optical emitters to cause the second set of optical emitters to emit optical signals in a second optical spectrum, wherein the second set of optical emitters is arranged to face the circular light scattering channel in the ring shaped optical waveguide; and
receiving light emitted from the second set of optical emitters at a second optical receiver, wherein the second optical receiver is arranged to face one of the outer circumferential edges of the ring shaped optical waveguide.

17. The method of claim 16, further comprising:
applying a third electrical signal to a third set of optical emitters to cause the third set of optical emitters to emit optical signals in a third optical spectrum, wherein the third set of optical emitters is arranged to face the circular light scattering channel in the ring shaped optical waveguide; and
receiving light emitted from the third set of optical emitters at a third optical receiver, wherein the third optical receiver is arranged to face one of the outer circumferential edge of the ring shaped optical waveguide.

18. The method of claim 17, wherein the second electrical signal and the third electrical signal are applied at substantially the same time.

19. The method of claim 17, further comprising:
filtering the light emitted from the second set of optical emitters using a first optical filter; and
filtering the light emitted from the third set of optical filters using a second optical filter.

20. The method of claim 16, further comprising providing an electrical signal corresponding to the light received from the second set of optical emitters to a signal processor.

* * * * *